United States Patent
Moss et al.

(10) Patent No.: US 10,551,403 B2
(45) Date of Patent: Feb. 4, 2020

(54) PITOT TUBE INSTRUMENT (71) Applicant: DWYER INSTRUMENTS, INC., Michigan City, IN (US)

(72) Inventors: Robert Austin Moss, Saint Joseph, MI (US); Shilei Ma, Wilmette, IL (US)

(73) Assignee: DWYER INSTRUMENTS, INC., Michigan City, IN (US)

( * ) Notice: Subject to any disclaimer, the term of this patent is extended or adjusted under 35 U.S.C. 154(b) by 39 days.

(21) Appl. No.: 16/018,347

(22) Filed: Jun. 26, 2018

(65) Prior Publication Data
US 2018/0372771 A1 Dec. 27, 2018

Related U.S. Application Data (60) Provisional application No. 62/524,687, filed on Jun. 26, 2017.

(51) Int. Cl.
*G01P 5/16* (2006.01)
*G01F 1/46* (2006.01)
*G01F 1/34* (2006.01)
*G01F 15/14* (2006.01)
*G01P 5/165* (2006.01)

(52) U.S. Cl.
CPC ............... *G01P 5/165* (2013.01); *G01F 1/46* (2013.01)

(58) Field of Classification Search
CPC ............ G01F 1/46; G01F 1/34; G01F 15/114
See application file for complete search history.

(56) References Cited

U.S. PATENT DOCUMENTS

| | | | |
|---|---|---|---|
| 5,099,686 A | 3/1992 | Koehler | |
| 5,736,651 A * | 4/1998 | Bowers | G01F 1/46 |
| | | | 73/861.66 |
| 10,317,422 B2 * | 6/2019 | Kearney | G01P 5/165 |
| 2005/0273278 A1 | 12/2005 | Sprague | |
| 2013/0145836 A1 | 6/2013 | Mandle | |
| 2017/0322059 A1 * | 11/2017 | Lowe | G01F 1/46 |

FOREIGN PATENT DOCUMENTS

WO 2007/042803 A1 4/2007

OTHER PUBLICATIONS

PCT International Search Report and Written Opinion for corresponding International Application Serial No. PCT/US18/39488, dated Sep. 14, 2018, pp. 1-10.

* cited by examiner

*Primary Examiner* — Jewel V Dowtin
(74) *Attorney, Agent, or Firm* — Tarolli, Sundheim, Covell & Tummino LLP (57) ABSTRACT

An apparatus for obtaining pressure measurements in an airstream includes a Pitot tube. The Pitot tube includes at least one total pressure port configured to be positioned in the airstream facing upstream, at least one static pressure port configured to be positioned in the airstream facing downstream, at least one first directional port, and at least one second directional port. The at least one first directional port and the at least one second directional port are positioned on opposite sides of the at least one total pressure port and face obliquely with respect to the direction that the at least one total pressure port faces.

14 Claims, 8 Drawing Sheets

PITOT TUBE INSTRUMENT

RELATED APPLICATION

This application claims the benefit of U.S. Provisional Application Ser. No. 62/524,687, filed Jun. 26, 2017, the disclosure of which is hereby incorporated by reference in its entirety.

TECHNICAL FIELD

This disclosure relates to a Pitot tube instrument for measuring static air pressure in ductwork in order to calculate air flow.

BACKGROUND

In air conditioning, heating and ventilating work, it is helpful to understand the techniques used to determine air velocity. In this field, air velocity (distance traveled per unit of time) is usually expressed in feet per minute (FPM). By multiplying air velocity by the cross section area of a duct, you can determine the air volume flowing past a point in the duct per unit of time. Volume flow is usually measured in cubic feet per minute (CFM). These volume measurements can often be used with engineering handbook or design information to reveal proper or improper performance of an airflow system.

To move air, fans or blowers are usually used. They work by imparting motion and pressure to the air with either a screw propeller or paddle wheel action. When force or pressure from the fan blades causes the air to move, the moving air acquires a force or pressure component in its direction of motion due to its weight and inertia. This force is called velocity pressure. It is measured in inches of water column (w.c.) or water gage (w.g.). In operating duct systems, a second pressure is always present. It is independent of air velocity or movement. Known as static pressure, it acts equally in all directions. In air conditioning work, this pressure is also measured in inches w.c.

In pressure or supply systems, static pressure will be positive on the discharge side of the fan. In exhaust systems, a negative static pressure will exist on the inlet side of the fan. When a fan is installed midway between the inlet and discharge of a duct system, it is normal to have a negative static pressure at the fan inlet and positive static pressure at its discharge.

Total pressure is the combination of static and velocity pressures, and is expressed in the same units. It is an important and useful concept to use because it is easy to determine and, although velocity pressure is not easy to measure directly, it can be determined easily by subtracting static pressure from total pressure. This subtraction need not be done mathematically. It can be done automatically through the configuration of the instrument.

For most industrial and scientific applications, the only air measurements needed are those of static pressure, total pressure, and temperature. With these measurements, air velocity and volumetric flow can be calculated. To facilitate these measurements in commercial or industrial ductwork, the duct walls can be outfitted with one or more static pressure taps. The pressure taps extend through the duct wall perpendicularly to the air flow direction in the duct and allow for the attachment a pressure sensing device.

For ductwork with substantially uniform, well developed flow, the tap or opening of the pressure sensors can be mounted flush with the wall of the duct. For ductwork where flow is non-uniform and/or turbulent, sensing pressure is not so simple. This may be the case, for example, when sensing static pressure across industrial air filters and refrigerant coils in commercial or industrial ductwork because those structures create disturbances in the air flowing over them. disruptions can also occur in the area of T-junctions where HVAC runs branch off from other ducts. Disruptions in the air stream increases the risk of impingement, aspiration, or unequal distribution of the moving air in the area close to the duct wall. To account for this, when taking static pressure measurements across industrial air filters and refrigerant coils, the use of a static pressure tip is ideal.

Static pressure tips are tubular probe instruments that can be inserted into the duct through a static pressure tap. The static pressure tip extends into the duct perpendicular to the air flow direction and can be positioned away, e.g., centrally, from the duct walls. The static pressure tip has a 90-degree bend near the end, which positions the tip facing the directly into the airflow. Static pressure is sensed through holes drilled radially though the tubular sidewall near the tip of the probe. Thus, instead of measuring static pressure through an opening that is flush with the duct wall, perpendicular to the airflow direction, static pressure is measured through an opening that is flush with the sidewall of the probe, perpendicular to the airflow direction.

In sensing static pressure, it is desirable to eliminate the effect of air movement. Eliminating the effect of air movement requires the determination of velocity pressure fully and accurately. This is usually done with an impact tube which faces directly into the air stream. This type of sensor is frequently called a "total pressure pick-up" since it receives the effects of both static pressure and velocity pressure. Thus, measuring velocity pressure typically involves measuring total pressure pick-up and compensating or cancelling out the effects of static pressure. This can be done by connecting a static pressure sensing device and a total pressure sensing device across a differential pressure manometer. Since the static pressure is applied to both sides of the manometer, its effect is cancelled out and the manometer indicates only the velocity pressure. To translate velocity pressure into actual velocity requires either mathematical calculation, reference to charts or curves, or prior calibration of the manometer to directly show velocity.

In practice, these types of measurements are usually made with a Pitot tube which incorporates both static and total pressure measurements in a single unit. Essentially, a Pitot tube consists of an impact tube (which receives total pressure input) fastened concentrically inside a second tube of slightly larger diameter which receives static pressure input from radial sensing holes around the tip. The air space between the inner and outer tubes permits transfer of pressure from the sensing holes to the static pressure connection at the opposite end of the Pitot tube and then, through connecting tubing, to the low or negative pressure side of a manometer. When the total pressure tube is connected to the high pressure side of the manometer, velocity pressure is indicated directly.

To ensure accurate velocity pressure readings, the Pitot tube tip must be pointed directly into (parallel with) the air stream. As the Pitot tube tip is parallel with the static pressure outlet tube, the latter can be used as a pointer to align the tip properly. When the Pitot tube is correctly aligned, the pressure indication will be maximum. To assure well developed flow, the Pitot tube should be inserted at least 8.5 duct diameters downstream from elbows, bends or other obstructions which cause circulation. In other words, the reading should be taken a distance downstream that is equal to or greater than the 8.5 times the duct diameter. Additionally, to ensure the most precise measurements, straightening vanes should be located 5 duct diameters upstream from the Pitot tube.

In most if not all practical situations, the velocity of the air stream is not uniform across the cross section of a duct. Friction slows the air moving close to the walls, so the velocity is greater in the center of the duct. To obtain the average total velocity in ducts of 4" diameter or larger, a series of velocity pressure readings must be taken at points of equal area. A formal pattern of sensing points across the duct cross section is recommended. These are known as traverse readings.

For round ducts, it is recommended that velocity pressure readings should be taken at centers of equal concentric areas along two diameters. At least 20 readings should be taken. In rectangular ducts, a minimum of 16 and a maximum of 64 readings are taken at centers of equal rectangular areas. Actual velocities for each area are calculated from individual velocity pressure readings. This allows the readings and velocities to be inspected for errors or inconsistencies. The velocities are then averaged and used to determine flow according to known and accepted practices.

For maximum accuracy, it can be recommended that the following precautions should be observed when taking traverse pressure readings:

The duct diameter should be at least 30 times the diameter of the Pitot tube.

The Pitot tube should be located in a duct section that provides 8.5 or more duct diameters upstream of the Pitot tube and 1½ or more diameters downstream of Pitot tube that is free of elbows, size changes, or obstructions.

An egg-crate type flow straightener should be positioned 5 duct diameters upstream of Pitot tube.

The technician should perform a complete, accurate traverse.

In small ducts, or where traverse operations are otherwise impossible, an accuracy of ±5% can be achieved by placing Pitot tube in center of duct. The air velocity determined from this reading can then be multiplied by 0.9 for an approximate average.

Manometers for use with a Pitot tube are offered in a choice of two scale types. Some are made specifically for air velocity measurement and are calibrated directly in feet per minute. These calibrations are correct for standard air conditions, i.e., an air density of 0.075 lb per ft$^3$ corresponds to dry air at 70° F., at a barometric pressure of 29.92 inches Hg. To correct the velocity reading for other than standard air conditions, the actual air density must be known. It may be calculated if relative humidity, temperature, and barometric pressure are known. Most manometer scales are calibrated in inches of water. Using readings from such an instrument, the air velocity may be calculated using the basic formula:

$$v = \sqrt{\frac{h_v}{d}} \ \{= 4004.4\sqrt{h_v} \text{ for .075 lb/ft}^3 \text{ dry air @ 70° F., 29.92 in. Hg}\};$$

where:
v=velocity in feet per minute;
$h_v$=velocity pressure in inches of water; and
d=density of air in pounds per cubic foot.
To determine dry air density, use the formula:

$$d = 1.325 \cdot \frac{P_B}{T};$$

where:
d=Air density in pounds per cubic foot;
$P_B$=Barometric (or absolute) static pressure in inches of mercury; and
T=Absolute temperature (indicated temperature in ° F. plus 460°).

With dry air at 29.9 inches mercury, air velocity can be read directly from standard curves found in HVAC engineering handbooks. For partially or fully saturated air, further correction is required. This can be done using standard curves for air at certain saturation levels, either directly or through interpolation. To save time a variety of tools, such as physical, slide rule type devices or computerized calculators (e.g., smartphone app) can be used.

Once the average aft velocity is known, the aft flow rate in cubic feet per minute is easily computed using the formula:

$$Q=AV$$

where:
Q=Quantity of flow in cubic feet per minute;
A=Cross sectional area of duct in square feet; and
V=Average velocity in feet per minute.

Manufacturers of aft filters, cooling and condenser coils and similar equipment often publish data from which approximate aft flow can be determined. It is characteristic of such equipment to cause a pressure drop which varies proportionately to the square of the flow rate. Manufacturers provide curves for air flow versus resistance. For example, a curve for a clean air filter might indicate an air flow of 2,000 c.f.m. for a pressure drop of 0.50 in w.c.

Additionally or alternatively, given a manufacturer's specification for a filter, the flow can be calculated. For example, a specification may state that a given flow Q (ft3/min.) occurs at a given differential "h" (inches w.c.), flow at other differentials can be determined using the formula:

$$Q_n = Q\sqrt{\frac{h_n}{h}}$$

where:
Q=Given flow in cubic feet per minute;
$Q_n$=Other flow in cubic feet per minute;
h=Given differential in inches w.c. (corresponding to given flow); and
$h_n$=Differential in inches water column for other flow conditions.

The above represents some of the current, ideal practices for taking traverse pressure readings in order to help ensure accurate duct airflow measurements. Often, even more often than not, access to the ductwork by technicians is limited, which can prevent the technician from taking traverse readings at the ideal location. Many times, these locations do not allow enough room for the air flow to become fully developed, which can prevent accurate traverse readings. For example, in some scenarios, limited access to ductwork forces the technician to take the traverse reading near a "tee" in the ductwork, where separation regions can exist. In these regions, re-circulation and reverse flow can occur.

Because of this, in many cases, traverses are not suitable for determining airflow in HVAC systems due to short runs and the characteristic recirculation and reverse flow that occurs therein. Testing has proven that accurate flow measurements taken via traverse readings do not occur until they are taken at a distance beyond 7.5 diameters, i.e., at least 8.5 diameters, downstream of the tee junction. For example, for a 12-inch diameter duct, the traverse measurements must be taken at least 8.5 diameters, or 8.5 feet, from the tee junction in order to be accurate. Many times, this is not possible, as the building architecture dictates that the measurements can only be taken in closer proximity to the junction.

SUMMARY

The invention relates to a straight Pitot tube that includes total pressure port(s) and static pressure port(s) and has added to it flow direction detecting ports on opposite sides of the total pressure ports. The angle between the direction detecting ports can, for example, be 45 degrees from the total pressure ports, (90 degrees total) 60 degrees from the total pressure ports (120 degrees total), angles between 60 and 90, etc. Conducting the traversal measurement, a magnitude differential pressure ("DP") is recorded via the total and static pressure ports, and a directional DP is recorded via the direction detecting ports. Using a 3-D mapping technique based on calibration data for the Pitot tube acquired measuring known flows, angular flow components are canceled and the velocity of the airflow in a direction parallel to the longitudinal duct axis is more accurately determined. This velocity can be used to determine a more accurate measure of airflow in the duct.

According to one aspect, an apparatus for obtaining pressure measurements in an airstream includes a Pitot tube. The Pitot tube includes at least one total pressure port configured to be positioned in the airstream facing upstream, at least one static pressure port configured to be positioned in the airstream facing downstream, at least one first directional port, and at least one second directional port. The at least one first directional port and the at least one second directional port are positioned on opposite sides of the at least one total pressure port and face obliquely with respect to the direction that the at least one total pressure port faces.

According to another aspect, alone or in combination with any other aspect, the Pitot tube can extend along a longitudinal Pitot axis. The at least one total pressure port, the at least one static pressure port, the at least one first directional port, and the at least one second directional port each can extend along a respective axis that extends radially from the Pitot axis.

According to another aspect, alone or in combination with any other aspect, the axis along which the at least one first directional port extends and axis along which the at least one second directional port extends are at an angle relative to each other. The angle can be between 90 and 120 degrees.

According to another aspect, alone or in combination with any other aspect, the axis of the at least one total pressure port can bisect the angle at which the axis of the at least one first directional port and the axis of the at least one second directional port extend.

According to another aspect, alone or in combination with any other aspect, the axis of the at least one total pressure port, the axis of the at least one static pressure port, the axis of the at least one first directional port, and the axis of the at least one second directional port can extend perpendicular to the Pitot axis.

According to another aspect, alone or in combination with any other aspect, the axis of the first direction detecting port and the axis of the second direction detecting port can be coplanar.

According to another aspect, alone or in combination with any other aspect, the axis of the at least one total pressure port and the axis of the at least one static pressure port extend in directions that are 180-degrees opposite each other.

According to another aspect, alone or in combination with any other aspect, the Pitot tube can include an elongated cylindrical Pitot body and a Pitot head that terminates one end of the Pitot body. The at least one total pressure port, the at least one static pressure port, and the first and second directional ports can extend into the Pitot body. A total pressure conduit can extend through the Pitot body and can be fluidly connected to the at least one total pressure port. A static pressure conduit can extend through the Pitot body and can be fluidly connected to the at least one static pressure port. A first directional pressure conduit can extend through the Pitot body and can be fluidly connected to the at least one first directional port. A second directional pressure conduit can extend through the Pitot body and can be fluidly connected to the at least one second directional port.

According to another aspect, alone or in combination with any other aspect, the apparatus can also include a control unit for being operatively connected to the Pitot tube. The control unit can be configured to independently measure total pressure in the total pressure conduit, static pressure in the static pressure conduit, first directional pressure in the first directional conduit, and second directional pressure in the second directional conduit.

According to another aspect, alone or in combination with any other aspect, the control unit can be configured to measure a directional DP as the differential pressure between the first and second directional conduits and a magnitude DP as the differential pressure between the total pressure conduit and the static pressure conduit.

According to another aspect, alone or in combination with any other aspect, the control unit can be configured to include one or more calibration tables for the pitot tube. The calibration tables can be populated by measuring and storing magnitude DP and directional DP for a plurality of rotational angles of the Pitot tube and for a plurality of known flow velocities on a flow test bench where the flow is substantially uniform, laminar, and consistent.

According to another aspect, alone or in combination with any other aspect, the control unit can be configured to derive an airstream velocity within a duct from the one or more calibration tables using measured values of magnitude DP and directional DP taken from within the duct.

According to another aspect, alone or in combination with any other aspect, the control unit can be configured to determine a point within the one or more calibration tables where A) the stored magnitude DP equals the measured magnitude DP, B) the stored directional DP equals the measured directional DP, C) the stored velocities associated with the stored magnitude DP and stored directional DP are equal, and D) the stored angles associated with the stored magnitude DP and stored directional DP are equal. The control unit can be further configured to determine that the stored velocity determined in C) is the airstream velocity component, axial to the duct, measured via the Pitot tube.

DESCRIPTION

FIGS. 1-4 illustrate a system or apparatus 1 for measuring pressures of gases flowing in a duct. The system/apparatus 1 includes a Pitot tube 10 for obtaining pressures of gases flowing in a duct. More specifically, the Pitot tube 10 is particularly well-suited for measuring air pressures in HVAC ducts. While the description of the system/apparatus 1 and its implementation are described herein with reference to measuring air pressures in HVAC ducts, the system/apparatus can be used to measure pressures of other gasses traveling in a duct for any industrial, commercial, or residential application.

In the example HVAC implementation, the pressures measured by the Pitot tube 10 can be used to determine the velocity and/or volumetric flow of air in the duct. The pressures measured by the Pitot tube 10 include total pressure and static pressure. As known in the art and discussed above, these two measured pressures can be used to determine velocity pressure. Velocity pressure can be used to calculate the velocity of the airflow in the duct and the volumetric flow of air in the duct according to known and accepted practices and methods.

Velocity pressure is the total pressure minus the static pressure. Advantageously, the Pitot tube 10 is configured to sense total pressure and static pressure separately so that a differential between the two can be determined. To do this, the Pitot tube 10 includes at least one total pressure port 20 and at least one static pressure port 40. In the example configuration, there are two total pressure ports 20 and two static pressure ports 40.

The system/apparatus 1 also includes a control unit 100. The Pitot tube 10 is configured to be connected to the control unit 100. The control unit 100 (shown schematically) includes instrumentation, e.g., pressure transducers, for measuring the pressures obtained via the Pitot tube 10, and electronics for computing/calculating values, such as velocities and/or flow rates from the obtained pressures. The control unit 100 can, for example, measure the total pressure via the total pressure port 20 and the static pressure via the static pressure port 40. The control unit 100 can be configured, i.e., programmed, to calculate values using the measured values. For example, the control unit 100 can be configured to cancel the measured static pressure from the measured total pressure measured to obtain the velocity pressure. The Pitot tube 10 thus provides, in a single device, an instrument that can be used to measure total pressure, static pressure, and velocity pressure.

The Pitot tube 10 includes an elongated tubular Pitot body 12 that extends along a central longitudinal Pitot axis 14 of the Pitot tube 10. The Pitot tube 10 also includes a Pitot head 16 that terminates a first end of the Pitot body 12. A fitting assembly 80 terminates an opposite second end of the Pitot body 12. The total pressure ports 20 and static pressure ports 40 extend into the Pitot head 16 transverse to the Pitot axis 14. In the example configuration of the Pitot tube 10, the ports 20, 40 extend perpendicular to the Pitot axis 14 in radially opposite directions, i.e., 180 degrees from each other.

The total pressure port 20 are configured to be positioned facing directly into the flow direction, i.e., upstream, (see arrow F) and parallel to the airstream being measured. The static pressure ports 40 are configured to be positioned facing directly away from the flow direction, downstream and parallel to the airstream being measured. For purposes of providing aerodynamics and minimizing the degree to which the Pitot tube 10 into the airstream affects the flow thereof, the Pitot head 16 can include a narrowed central portion 18 into which the total pressure ports 20 and the static pressure ports 40 extend.

In addition to the total pressure ports 20 and the static pressure ports 40, the Pitot tube 10 also includes direction detecting ports 60 that extend into the Pitot head 16 transverse to the Pitot axis 14. In the example configuration of the Pitot tube 10, the direction detecting ports 60 extend perpendicular to the Pitot axis 14. The direction detecting ports 60 face into, but not directly into, the flow direction of arrow F. In other words, the direction detecting ports 60 face upstream, but not directly upstream, of the airstream. The direction detecting ports 60 are spaced radially from each other and are positioned on radially opposite sides of the total pressure ports 20 in an equidistant manner. The direction detecting ports 60 thus face obliquely with respect to the direction of the total pressure ports 20. Because of this radial spacing, the direction detecting ports 60 extend into a cylindrical portion 64 of the Pitot head 16 positioned adjacent the central portion 18.

Figure 3:
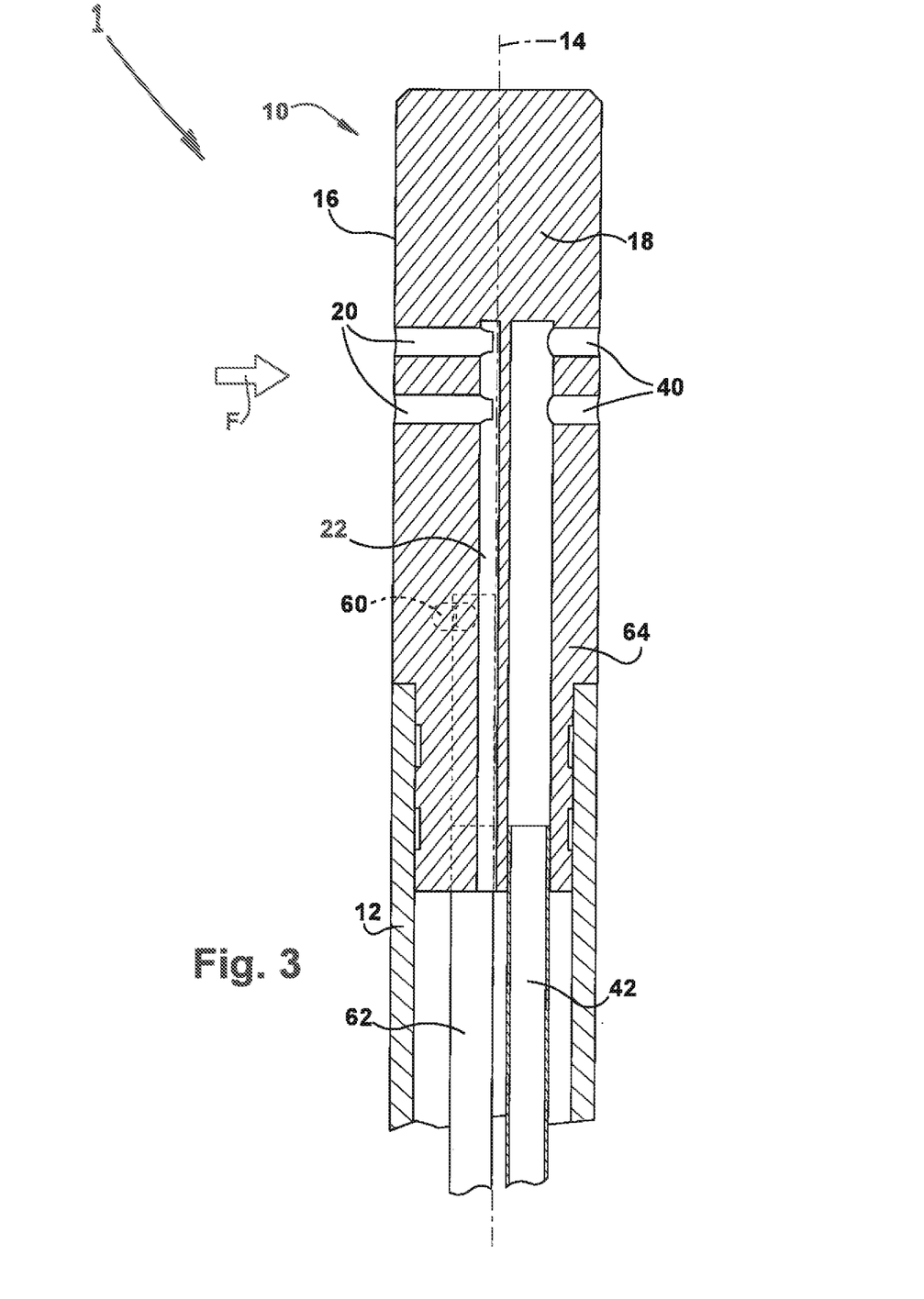
FIG. 3 is a sectional view of the Pitot tube taken generally along line 3-3 in FIG. 1.

Referring to FIG. 3, in the example configuration, each of the ports 20, 40, and 60 extend along their own respective central axis. More specifically, each of the total pressure ports 20 extends along a respective axis 24, each of the static pressure ports 40 extends along a respective axis 44, and each of the direction detecting ports 60 extends along an axis 66 and 68, respectively. Each axis 24, 44, 66, and 68 is perpendicular to the Pitot axis 14. The total pressure port axis 24 and the static pressure port axis 44 extend in directions 180-degrees opposite each other. The direction detecting port axis 66 extends at an angle, indicated generally at A in FIG. 3, relative to the total pressure port axis 24. The direction detecting port axis 68 extends at an angle, indicated generally at B in FIG. 3, relative to the total pressure port axis 24. The direction detecting port axis 66 and axis 68 are coplanar and extend at an angle, indicated generally at C in FIG. 3, relative to each other. Angles A and B are equal to each other.

The direction detecting ports 60 can be configured, for example, so that each is positioned between 60 and 90 degrees radially from the total pressure ports 20. For example, the direction detecting ports 60 can be configured so that each is positioned 60-degrees radially from the total pressure ports 20, i.e., angles A and B are 60-degrees and angle C is 120-degrees. As another example, the direction detecting ports 60 can be configured so that each is positioned 45-degrees radially from the total pressure ports 20, i.e., angles A and B are 45-degrees and angle C is 90-degrees. Other values for angles A, B, and, therefore, C can be selected.

Inside the Pitot tube 10, the total pressure ports 20 are connected to a total pressure conduit 22, the static pressure ports 40 are connected to a static pressure conduit 42, and the direction detecting ports 60 are connected to respective direction detecting conduits 62. The conduits 22, 42, and 62 are isolated from each other and extend the length of the Pitot body 12. In the example configuration, the Pitot body 12 itself serves as the total pressure conduit 22 between the Pitot head 16 and the fitting assembly 80. The configuration of the conduits 22, 42, and 62 could vary. For example, total pressure conduit 22 could be a separate conduit similar to the static pressure conduit 42 and the directional pressure conduits 62. In another example configuration, the conduits 22, 42, and 62 can be separate and spaced from each other. In other example configurations, some or all of the conduits could be nested in a concentric and coaxial manner.

Figure 1:
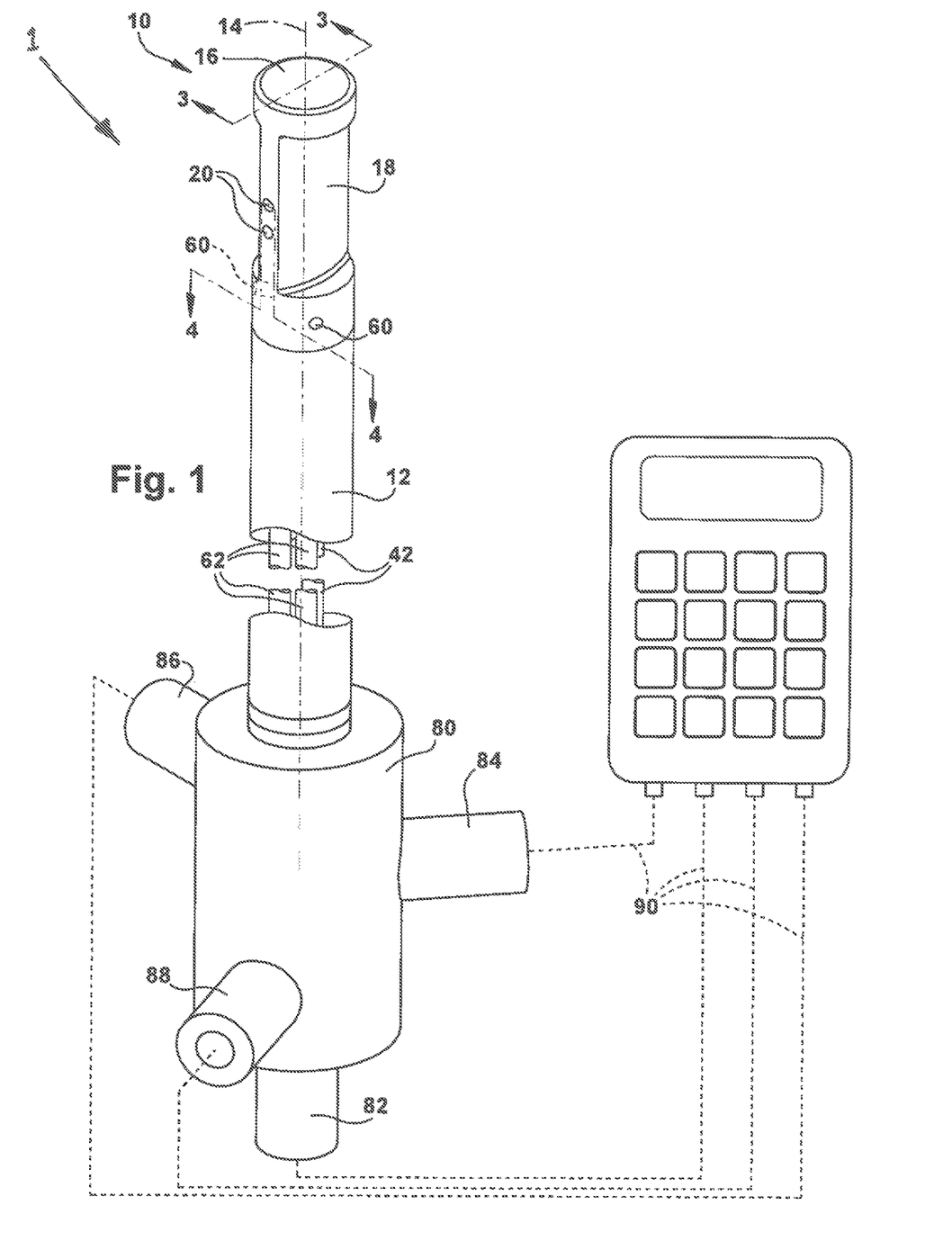
FIG. 1 is a perspective front view illustrating a Pitot tube according to one example configuration.
Figure 2:
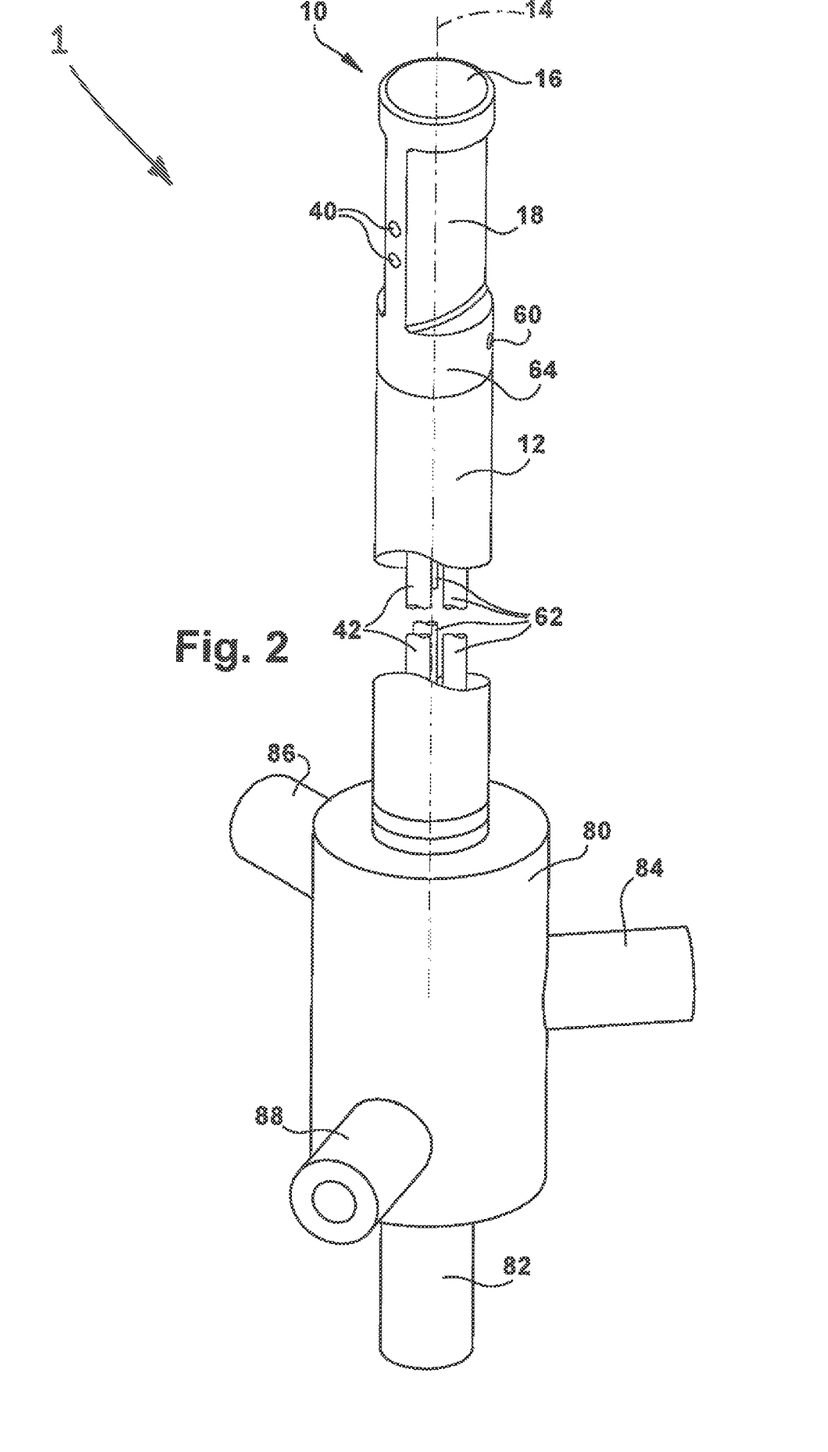
FIG. 2 is a perspective rear view of the Pitot tube.

The conduits 22, 42, and 62 are connected to the control unit 100 in an airtight manner in order to allow the device to measure the pressures in the conduits. Conventional or customized airtight fittings can be used to perform this function. This is shown in FIG. 1. The control unit 100 is connected to the Pitot tube 10 via flexible tubes or conduits 90 that are connected to fittings 82, 84, 86, 88 of the fitting assembly 80. The fittings 82, 84, 86, 88 provide fluid communication between the conduits 22, 42, 62 and therefore provide the pressures obtained via the Pitot tube 10 to the control unit 100. More specifically, in the example configuration, the fitting 82 is connected to the total pressure conduit 22 and therefore provides the total pressure sensed via the Pitot tube 10 to the control unit 100. The fitting 84 is connected to the static pressure conduit 42 and therefore provides the static pressure sensed via the Pitot tube 10 to the control unit 100. The fittings 84 and 86 are connected to respective ones of the directional pressure conduits 62 and therefore provides the directional pressures sensed via the Pitot tube 10 to the control unit 100.

The control unit 100 can have any configuration selected to obtain pressure readings from the Pitot tube via the conduits 22, 42, 62, perform calculations on the pressure reading values, and display information to the technician performing the pressure readings. For example, as shown in the example configuration, the control unit 100 can be an all-in-one, e.g., handheld unit, with the electronics and pressure transducers housed together. In this configuration, the pressure connections between the control unit 100 and the Pitot tube 10 are be made with the flexible hoses or tubes 90, which allow the technician to manipulate the Pitot tube while holding the control unit 100 in a convenient location.

As another alternative, the control unit could include a transceiver unit that houses the pressure transducers and is connected to the Pitot tube conduits 22, 42, 62, again via conduits/hoses/tubes. This transceiver could include a wireless communication radio/electronics for communicating the measured pressures to a separate handheld portion of the control unit. In one particular implementation, this separate handheld portion can be a custom handheld unit designed specifically for the purpose of using with the Pitot tube 10. In another particular implementation, this separate handheld portion can be a smart device, such as a smartphone, that communicates with the transceiver via Bluetooth communication protocol and upon which a custom software application is installed.

Because the direction detecting ports 60 are angled relative to each other, the differential pressure between the two varies as a function of the rotational position of the Pitot tube 10, i.e., rotated about the Pitot axis 14. In ideal conditions of even, uniform, laminar flow, the differential pressure between the ports 60 will be zero when the total pressure port 20 faces directly into and parallel with the airstream. This is because the total pressure port 20 is centered between the direction detecting ports 60. The direction detecting ports 60 will see the same pressure when the total pressure port faces directly into the airstream. As the Pitot tube 10 rotates about the Pitot axis 14, a differential in the pressures seen by the direction detecting ports 60 varies. The differential pressure across the direction detecting ports 60 varies with the angular position of the Pitot tube 10.

The direction detecting ports 60 and the differential pressure between the two can be taken advantage of in order to allow the Pitot tube 10 to conduct traversal measurements closer to transition points in the ductwork, such as elbows, tees, and cross-sectional reductions. The DP measurements taken via the direction detecting ports 60 can be used to cancel the non-axial flow components caused by disturbances in the ductwork. This is achieved via the control unit 100, which determines the axial airflow component, i.e., the airflow parallel to the longitudinal duct axis, by implementing a 3-D mapping technique based on calibration data for the Pitot tube 10. The calibration data is acquired by measuring known flows via the Pitot tube 10 in a highly controlled testing environment, such as a flow test bench/wind tunnel, in which uniform, well developed flow at known velocities can be generated.

To obtain the calibration data, the Pitot tube 10 is mounted on the test bench/wind tunnel and connected via the conduits 22, 42, 62 to highly accurate pressure sensors that allow for measuring the differential pressure across the direction detecting ports 60, referred to as directional differential pressure or "directional DP," and the differential pressure across the total pressure port 20 and static pressure port 40, referred to as airflow magnitude differential pressure or "magnitude DP."

Figure 5:
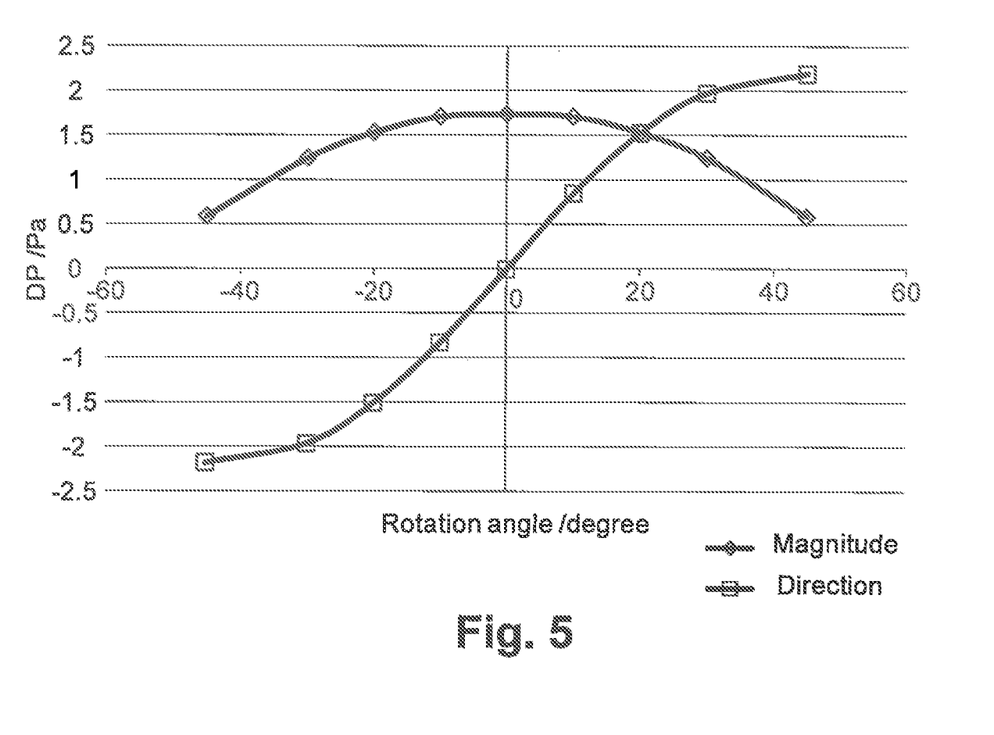
FIG. 5 is a graph that compares certain values measured via the Pitot tube.

This is illustrated in FIG. 5, which plots the data shown below in Table 1.

TABLE 1

| Sweep Angle | Total Pressure | Static Pressure | Direction Pressure 1 | Direction Pressure 2 | Magnitude DP | Direction DP |
|---|---|---|---|---|---|---|
| −45 | 0.119497 | −0.462763 | 1.35242 | −0.833899 | 0.58226 | −2.186319 |
| −30 | 0.783544 | −0.452999 | 1.19663 | −0.771562 | 1.236543 | −1.968192 |
| −20 | 1.09095 | −0.433372 | 0.900152 | −0.616824 | 1.524322 | −1.516976 |
| −10 | 1.29904 | −0.403615 | 0.478888 | −0.358692 | 1.702655 | −0.83758 |
| 0 | 1.34483 | −0.389757 | 0.0299349 | 0.0122973 | 1.734587 | −0.0176376 |
| 10 | 1.29904 | −0.403615 | −0.358692 | 0.478888 | 1.702655 | 0.83758 |
| 20 | 1.09095 | −0.433372 | −0.616824 | 0.900152 | 1.524322 | 1.516976 |
| 30 | 0.783544 | −0.452999 | −0.771562 | 1.19663 | 1.236543 | 1.968192 |
| 45 | 0.119497 | −0.462763 | −0.833899 | 1.35242 | 0.58226 | 2.186319 |

Viewing FIG. 5 in conjunction with the data in Table 1, it can be seen that as the Pitot tube 10 is swept angularly in the illustrated increments from −45 degrees to 45 degrees, the magnitude DP increases, peaks at 0 degrees, and decreases evenly and uniformly. This is to be expected, especially since the readings were taken on a highly controlled flow test bench, where flow is uniform, well developed, and consistent. Through this same angular sweep of the Pitot tube 10, the directional DP increases uniformly from a negative extreme at −45 degrees to a positive extreme at 45 degrees. Again, this is expected as the differential between the two radially spaced direction detecting ports 60 shifts from one port to the other.

Conducting the calibration, traversal measurements are then recorded for a series of known flow rates that span the range of airflows that the Pitot tube 10 is configured to detect. For each flow rate in the series, a complete traversal is performed. At each traversal position, the Pitot tube 10 is rotated through a series of predetermined rotational/angular positions, referred to as an "angular sweep," and the directional DP and magnitude DP is recorded for each position. For example, as illustrated in FIG. 5 and Table 1, at each traversal position, the angular sweep of the Pitot tube 10 can be a series of angles from +45-degrees to −45-degrees (e.g., an angular sweep of 0, ±10, ±20, ±30, ±45). Once a complete traversal with angular sweeps at one airflow rate is completed, the airflow in the flow test bench is incremented and another complete traversal with angular sweeps is performed. Through this testing, tables of directional DP and magnitude DP for traversals with angular sweeps through a range of known airflows is obtained.

Figure 6A:
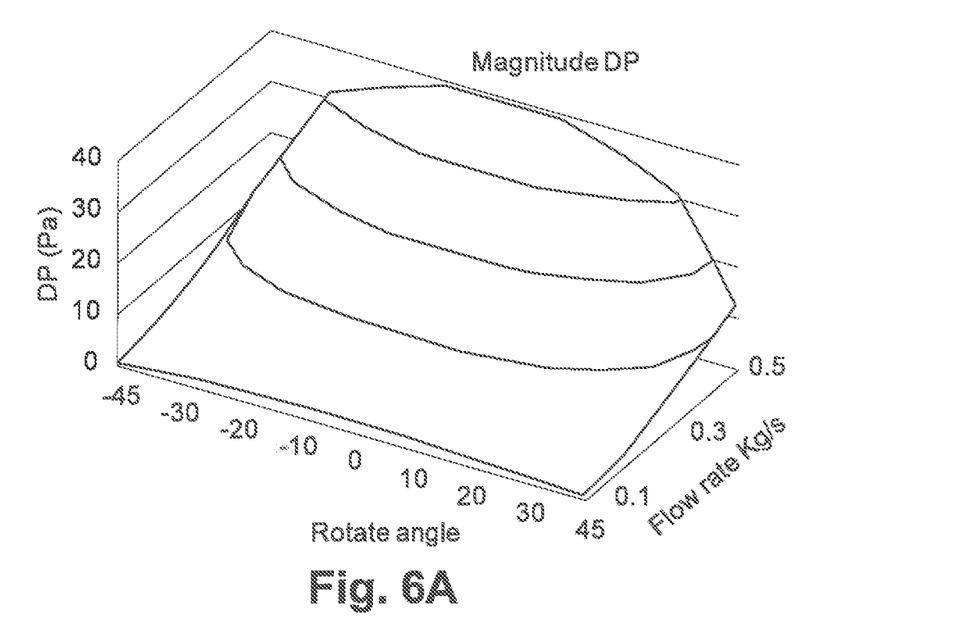
FIGS. 6A and 6B illustrate three-dimensional data that illustrate the relationships between data acquired via the Pitot tube.
Figure 6B:
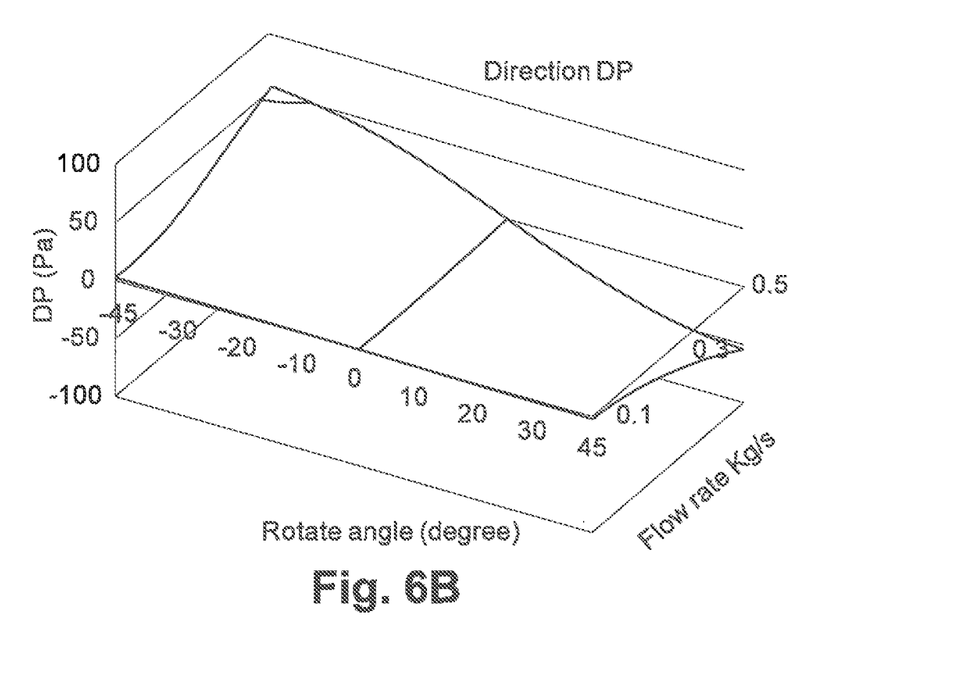

This principal is illustrated in FIGS. 6A and 6B. FIG. 6A illustrates magnitude differential pressures measured through an angular sweep (−45 degrees to 45 degrees) at degree increments of −45, −30, −20, −10, 0, 10, 20, 30, and 45 degrees. In FIG. 6A, for purposes of simplicity and illustration, the sweeps are performed at two flow rates only: 0.1 kg/s and 0.5 kg/s. In practice, angular sweeps can be taken at a larger, even much larger, number of velocities and/or the number of angular increments of the sweep can be increased. Values between the measured points are filled in via interpolation to produce the 3-D plot as shown.

Similarly, FIG. 6B illustrates directional differential pressures measured through an angular sweep (−45 degrees to 45 degrees) at degree increments of −45, −30, −20, −10, 0, 10, 20, 30, and 45 degrees. Again, in FIG. 6B, for purposes of simplicity and illustration, the sweeps are performed at two flow rates only: 0.1 kg/s and 0.5 kg/s. Again, in practice, angular sweeps can be taken at a larger, even much larger, number of velocities and/or the number of angular increments of the sweep can be increased. Values between the measured points are filled in via interpolation to produce the 3-D plot as shown.

FIGS. 6A and 6B illustrate that flow rate and rotational angle can be derived from magnitude DP and direction DP, and that these values are unique. This is the principal under which the system/apparatus 1 operates. Stored calibration data for the Pitot tube 10 similar to that shown in FIGS. 6A and 6B can be used to derive, most importantly, flow rate, but also rotation angles, based on magnitude DP and rotational DP measured via the tube. Since the calibration data is recorded in ideal conditions where flow is linear, well developed, and parallel to the longitudinal duct axis, the derived or calibrated velocity measurement cancels or substantially cancels the effects of angular flow components of the measured airstream. As a result, the calibrated velocity measurements, and the flow measurements calculated therefrom, are far less susceptible to flow variances caused by angular velocities caused by obstructions, T-connections, elbows, heat exchanger coils, diameter changes, etc. This allows for accurate measurements to be taken closer to these structures than conventionally accepted.

Figure 4:
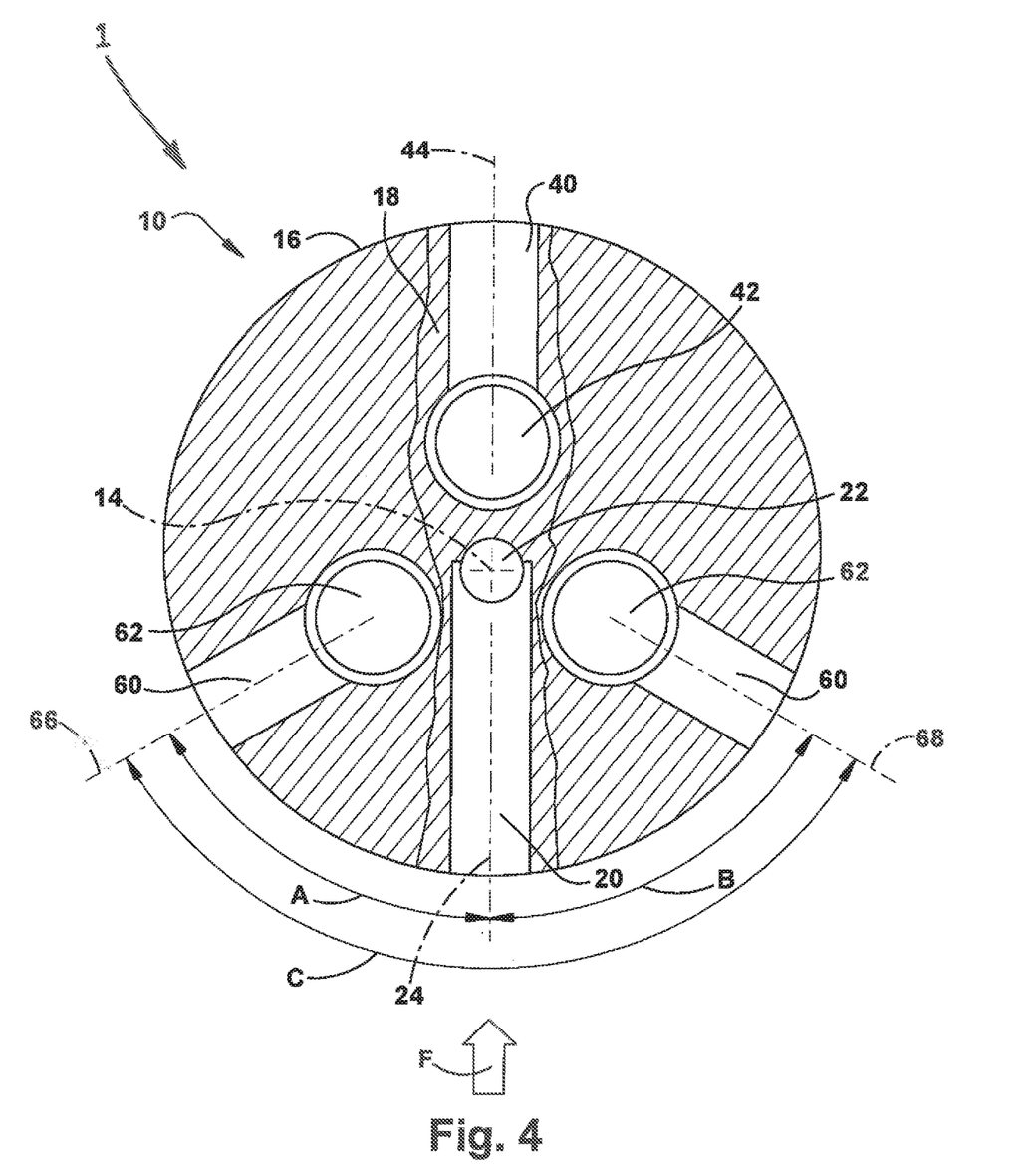
FIG. 4 is a sectional view of the Pitot tube taken generally along line 4-4 in FIG. 1.
Figure 7:
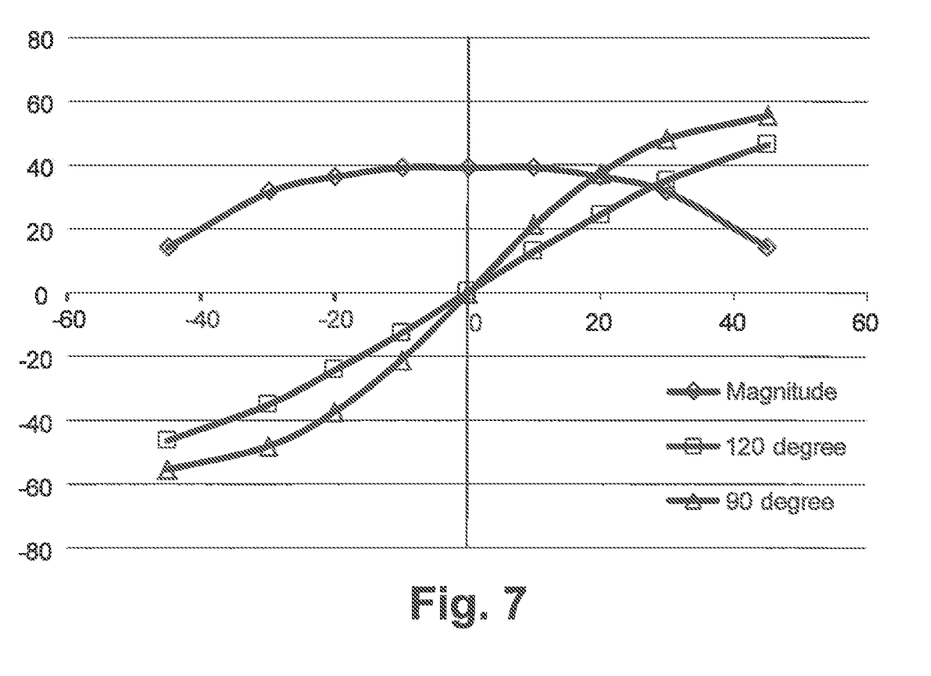
FIG. 7 is a graph illustrating the differences in data acquired via different configurations of the Pitot tube.

Additionally, the "shape" of the directional DP curve in FIG. 5 is related to the angles A, B, C between the directional ports 60 (See FIG. 4). Adjusting angles A, B, and C will change the shape of the curve. Selecting the proper angles A, B, C is a balance between linearity—the response to angular flow changes, and noise-pulsing and other noise in the pressure measurement signal resulting, for example, from vortex shedding along the angled surface into which the direction detecting ports 60 extend. For any given physical configuration of the Pitot tube 10, the angles A, B, C resulting in the ideal balance between linearity and noise will vary. This is illustrated in FIG. 7. As shown in FIG. 7 the curve for angle C=120 degrees (angle A=B=60 degrees) is more linear than the curve for angle C=90 degrees (angle A=B=45 degrees). Therefore, for the example configuration illustrated in FIGS. 1-4, it has been found through testing that angle A=B=60 and angle C=120 is an ideal configuration for the Pitot head 16.

Figure 8:
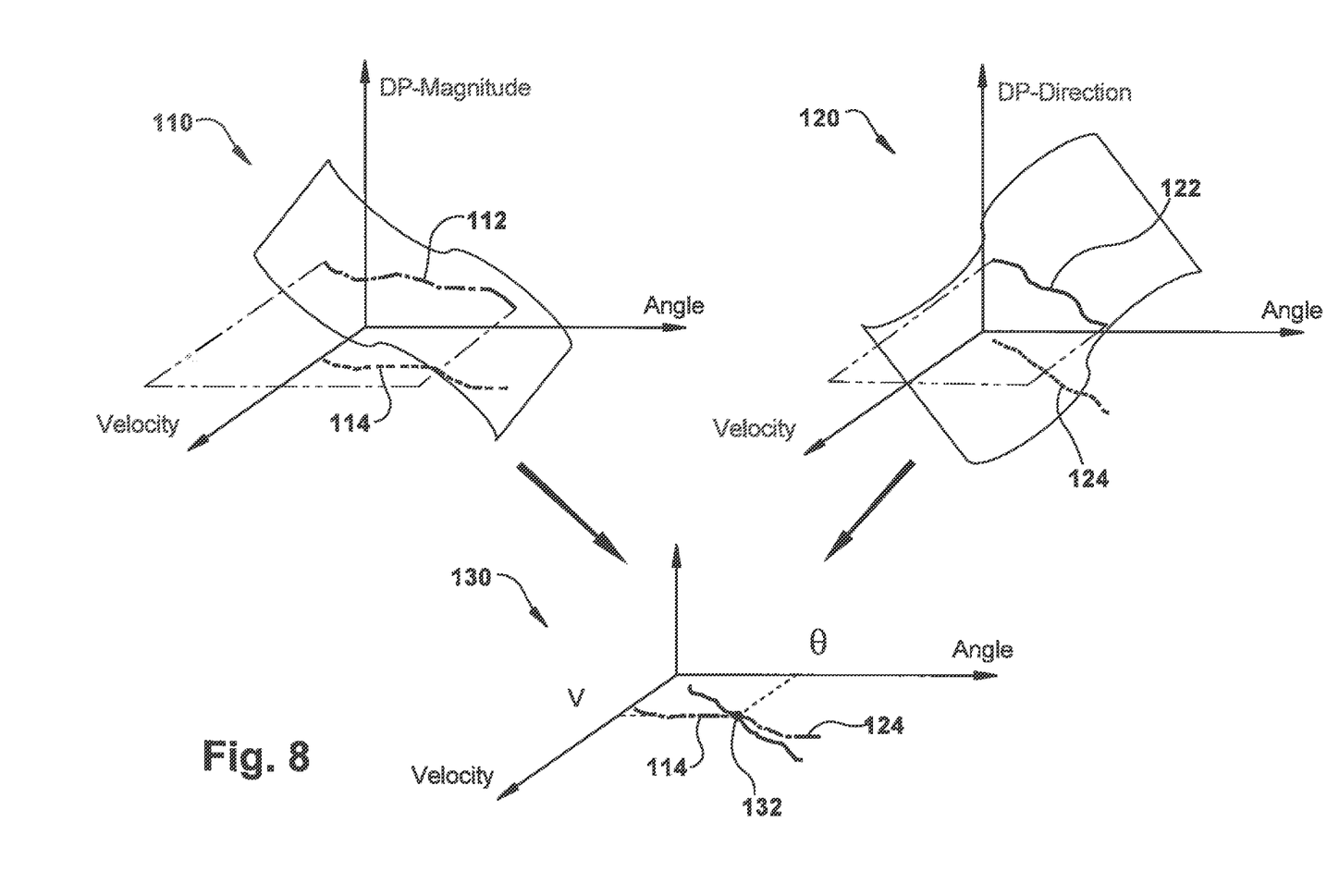
FIG. 8 illustrates combined three-dimensional data used to determine airflow using the Pitot tube.

From data obtained as set forth above, two three-dimensional plots are derived for the Pitot tube 10 and stored in the control unit 100 as tables. The control unit 100 uses these 3-D tables to determine airflows from the pressure readings taken via the Pitot tube 10. Examples of these two 3-D plots/tables and their use to determine velocity in the duct is represented graphically in FIG. 8. As shown in FIG. 8, a first table 110 table plots Pitot angle, flow velocity and magnitude DP. A second table 120 plots Pitot angle, flow velocity and directional DP. The shaded regions in the first and second tables 110, 120 indicates the calibration data, i.e., the 3-D data set of DP measurements taken at each angle in the angular sweep at each traversal position for each flow rate under the ideal conditions on the flow test bench/wind tunnel described above.

In practice, flow measurements are taken by positioning the Pitot tube 10 in the duct with the total pressure ports 20 facing upstream and parallel to the longitudinal axis of the duct. Magnitude DP and directional DP are recorded and processed by the control unit to cancel angular components of the airstream and determine its axial velocity. Viewing the first table 110, DP line 112 represents all points on the plot where magnitude DP is equal to the measured magnitude DP. Similarly, viewing the second table 120, DP line 122 represents all points on the plot where directional DP is equal to the measured directional DP. These DP lines 112 and 122 are transposed at lines 114 and 124 to illustrate the how the respective differential pressures represented by the lines relate to different combinations of linear velocity and tube angle.

To determine or derive the actual axial velocity using the 3-D mapping based on the calibration data shown in the first and second tables 110, 120, the lines 114 and 124 are combined in a third table 130. The intersection 132 of the lines 114, 124 indicates the linear flow velocity (v) and angle (θ) that cancels angular flow components for the particular combination of magnitude DP and directional DP measured via the Pitot tube 10. The velocity indicated at the intersection 132 thus indicates in a direction parallel to the longitudinal duct axis. This velocity, having canceled the effects of angular flow components, can be used to determine a more accurate measure of airflow in the duct.

Advantageously, implementation of the directional DP ports and the methods for determining axial velocity of the flow helps account for the effects of recirculation and reverse flow by canceling angular flow components. This allows for traversal measurements to be taken closer to transition points or flow disrupting structures in the ductwork, such as tees, elbows, and reductions in duct cross-sectional area.

While the calculations performed by the control unit 100 have been described in graphical terms with reference to FIG. 8, it should be appreciated that the calibration can be performed by look-up tables in which the various combinations of magnitude DP, velocity (v), and angle (θ) determined via calibration (i.e., the first table 110), and the various combinations of directional DP, velocity (v), and angle (θ) determined via calibration (i.e., the first table 110) are stored. To determine or derive the "intersection," i.e., the axial velocity would involve finding the entries in the tables where the velocity (v) and angle (θ) are equal. Of course, the tables may not include exact matches for the measured magnitude DP and Velocity DP, so some interpolation may be required.

In practice, the control unit 100 can be programmed to execute an application for assisting the technician in using the system/apparatus 1. As mentioned previously, the control unit 100 can be a custom controller unit, such as a handheld device that includes a user interface with input devices, such as keyboards, touchscreens, etc., and a display for conveying information to the technician. In one particular implementation, the control unit 100 can include a radio-transducer unit configured to make pressure readings and transmit those readings wirelessly, and a smart device, such as a smartphone, equipped with an app configured to communicate with the radio-transducer unit wirelessly (e.g., via Bluetooth or wifi) to obtain the pressure measurements.

Regardless of the form factor, the application implemented by the control unit 100 can be configured to assist the technician in taking traverse readings to measure flow. First, the application would prompt the technician for some data related to the duct upon which the traverse is being performed, such as duct dimensions and the number of traverse taps or openings. Based on this, the application would instruct the technician to insert the Pitot tube 10 into the traverse openings to a specific position or depth and to rotate the Pitot tube so that the total pressure ports are facing into the airstream perpendicular to the longitudinal duct axis. The control unit 100 would then record magnitude DP and directional DP for that traverse position and depth.

This process would be repeated at each insertion depth for each traverse position. The control unit 100 via the application would then determine or derive the linear flow velocities for each measurement using the 3-D mapping technique described above. Using the determined axial velocity values, the control unit 100 would then calculate the flow rate in duct according to known accepted methods.

While the invention has been described with reference to example configurations, those skilled in the art will appreciate that various changes can be made to the invention and equivalents can be substituted for elements of the invention without departing from the spirit and scope of the invention. Those skilled in the art will also appreciate that modifications can be made to adapt the invention for use in particular applications without departing from the spirit and scope of the invention. It should therefore be understood that the invention should not be limited to any particular configuration or implementation described herein. Instead, the invention can include any configuration falling within the scope of the appended claims.

We claim:

1. An apparatus for obtaining pressure measurements in an airstream, the apparatus comprising:
    a Pitot tube comprising:
        at least one total pressure port configured to be positioned in the airstream facing upstream;
        at least one static pressure port configured to be positioned in the airstream facing downstream;
        at least one first directional port; and
        at least one second directional port,
    wherein the at least one first directional port and the at least one second directional port are positioned on opposite sides of the at least one total pressure port and face obliquely with respect to the direction that the at least one total pressure port faces.

2. The apparatus recited in claim 1, wherein the Pitot tube extends along a longitudinal Pitot axis, and wherein the at least one total pressure port, the at least one static pressure port, the at least one first directional port, and the at least one second directional port each extend along a respective axis that extends radially from the Pitot axis.

3. The apparatus recited in claim 2, wherein the axis along which the at least one first directional port extends and the axis along which the at least one second directional port extends are at an angle relative to each other.

4. The apparatus recited in claim 3, wherein the angle is between 90 and 120 degrees.

5. The apparatus recited in claim 3, wherein the axis of the at least one total pressure port bisects the angle at which the axis of the at least one first directional port and the axis of the at least one second directional port extend.

6. The apparatus recited in claim 2, wherein the axis of the at least one total pressure port, the axis of the at least one static pressure port, the axis of at least one first directional port, and the axis of the at least one second directional port extend perpendicular to the Pitot axis.

7. The apparatus recited in claim 6, wherein the axis of the first direction detecting port and the axis of the second direction detecting port are coplanar.

8. The apparatus recited in claim 2, wherein the axis of the at least one total pressure port and the axis of the at least one static pressure port extend in directions that are 180-degrees opposite each other.

9. The apparatus recited in claim 1, wherein the Pitot tube comprises:
    an elongated cylindrical Pitot body;
    a Pitot head that terminates one end of the Pitot body, the at least one total pressure port, the at least one static pressure port, and the first and second directional ports extending into the Pitot body;
    a total pressure conduit that extends through the Pitot body and is fluidly connected to the at least one total pressure port;
    a static pressure conduit that extends through the Pitot body and is fluidly connected to the at least one static pressure port;
    a first directional pressure conduit that extends through the Pitot body and is fluidly connected to the at least one first directional port;
    a second directional pressure conduit that extends through the Pitot body and is fluidly connected to the at least one second directional port.

10. The apparatus recited in claim 9, further comprising a control unit for being operatively connected to the Pitot tube, the control unit being configured to independently measure total pressure in the total pressure conduit, static pressure in the static pressure conduit, first directional pressure in the first directional conduit, and second directional pressure in the second directional conduit.

11. The apparatus recited in claim 10, wherein the control unit is configured to measure a directional DP as the differential pressure between the first and second directional conduits and a magnitude DP as the differential pressure between the total pressure conduit and the static pressure conduit.

12. The apparatus recited in claim 11, wherein the control unit is configured to include one or more calibration tables for the pitot tube, wherein the calibration tables are populated by measuring and storing magnitude DP and directional DP for a plurality of rotational angles of the Pitot tube and for a plurality of known flow velocities on a flow test bench where the flow is substantially uniform, laminar, and consistent.

13. The apparatus recited in claim 12, wherein the control unit is configured to derive an airstream velocity within a duct from the one or more calibration tables using measured values of magnitude DP and directional DP taken from within the duct.

14. The apparatus recited in claim 13, wherein the control unit is configured to determine a point within the one or more calibration tables where:
   A) the stored magnitude DP equals the measured magnitude DP;
   B) the stored directional DP equals the measured directional DP;
   C) the stored velocities associated with the stored magnitude DP and stored directional DP are equal; and
   D) the stored angles associated with the stored magnitude DP and stored directional DP are equal,
   wherein the control unit is further configured to determine that the stored velocity determined in C) is the airstream velocity component, axial to the duct, measured via the Pitot tube.

* * * * *

UNITED STATES PATENT AND TRADEMARK OFFICE
CERTIFICATE OF CORRECTION

PATENT NO. : 10,551,403 B2
APPLICATION NO. : 16/018347
DATED : February 4, 2020
INVENTOR(S) : Robert Austin Moss and Shilei Ma Page 1 of 1

It is certified that error appears in the above-identified patent and that said Letters Patent is hereby corrected as shown below:

On the Title Page

Item (56), entitled References Cited, under U.S. PATENT DOCUMENTS, please replace 2005/0273278 A1 12/2005 Sprague with the following:
-- 2005/0034535 A1 2/2005 Sprague --

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*